US009961607B2

(12) United States Patent
Cui et al.

(10) Patent No.: US 9,961,607 B2
(45) Date of Patent: May 1, 2018

(54) NETWORK-ASSISTED CELL SELECTION AT CONNECTION RE-ESTABLISHMENT

(71) Applicant: Telefonaktiebolaget L M Ericsson (publ), Stockholm (SE)

(72) Inventors: Tao Cui, Upplands Väsby (SE); Walter Müller, Upplands Väsby (SE); Zhiyi Xuan, Täby (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 302 days.

(21) Appl. No.: 14/372,666

(22) PCT Filed: May 28, 2014

(86) PCT No.: PCT/SE2014/050657
§ 371 (c)(1),
(2) Date: Jul. 16, 2014

(87) PCT Pub. No.: WO2015/020584
PCT Pub. Date: Feb. 12, 2015

(65) Prior Publication Data
US 2015/0092686 A1    Apr. 2, 2015

Related U.S. Application Data

(60) Provisional application No. 61/863,953, filed on Aug. 9, 2013.

(51) Int. Cl.
*H04W 36/36* (2009.01)
*H04W 48/16* (2009.01)
*H04W 76/02* (2009.01)

(52) U.S. Cl.
CPC .......... *H04W 36/36* (2013.01); *H04W 48/16* (2013.01); *H04W 76/028* (2013.01)

(58) Field of Classification Search
CPC ... H04W 24/10; H04W 76/046; H04W 24/02; H04W 36/0083; H04W 36/0088; H04W 36/0094; H04W 76/028
See application file for complete search history.

(56) References Cited

U.S. PATENT DOCUMENTS 8,891,394 B2 * 11/2014 Jung et al. .............. 370/252
9,137,697 B2 *  9/2015 Jung et al.
(Continued)

FOREIGN PATENT DOCUMENTS

KR    20120011756 A    2/2012
KR    20120011757 A    2/2012

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.6.0, Jun. 2013, 1-209.

(Continued)

*Primary Examiner* — Ayaz Sheikh
*Assistant Examiner* — Debebe Asefa
(74) *Attorney, Agent, or Firm* — Sage Patent Group

(57) ABSTRACT

According to several disclosed techniques, a wireless network provides assistance information to a mobile terminal for cell selection at re-establishment of a connection after a radio link failure. An example method is implemented in a mobile terminal served in a first cell of a wireless network, and includes receiving (510) a configuration message from the network, the configuration message identifying at least one carrier frequency. Upon subsequently losing connection with the first cell without receiving a handover command, (Continued)

the mobile terminal initiates (520) a cell search using the identified at least one carrier frequency, based on the configuration message.

26 Claims, 5 Drawing Sheets

(56) References Cited

U.S. PATENT DOCUMENTS

| | | | |
|---|---|---|---|
| 9,161,240 B2* | 10/2015 | Jung et al. | |
| 2010/0227569 A1* | 9/2010 | Bala | H04L 5/0007 455/73 |
| 2010/0272035 A1* | 10/2010 | Park | H04W 74/006 370/329 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.4.0, Jun. 2013, 1-346.

3GPP, "3rd Generation Partnership Project; Technical Specification Group Radio Access Network; Evolved Universal Terrestrial Radio Access (E-UTRA); Requirements for support of radio resource management (Release 11)", 3GPP TS 36.133 V11.5.0, Jul. 2013, 1-432.

ETSI, "LTE; Evolved Universal Terrestrial Radio Access (E-UTRA); Radio Resource Control (RRC); Protocol specification (3GPP TS 36.331 version 9.0.0 Release 9)", ETSI TS 136 331 V9.0.0, Oct. 2009, 1-216.

ETSI, "LTE; Evolved Universal Terrestrial Radio Access (E-UTRA); Requirements for support of radio resource management (3GPP TS 36.133 version 10.1.0 Release 10)", ETSI TS 136 133 V10.1.0, Jan. 2011, 1-404.

ETSI, "LTE; Evolved Universal Terrestrial Radio Access (E-UTRA); User Equipment (UE) procedures in idle mode (3GPP TS 36.304 version 8.10.0 Release 8)", ETSI TS 136 304 V8.10.0, Jun. 2011, 1-32.

3GPP, "3rd Generation Partnership Project; Technical Specification Group Radio Access Network; Evolved Universal Terrestrial Radio Access (E-UTRA); Radio Resource Control (RRC); Protocol specification (Release 8)", 3GPP TS 36.331 V8.20.0, Jun. 2013, 1-210.

* cited by examiner

NETWORK-ASSISTED CELL SELECTION AT CONNECTION RE-ESTABLISHMENT

TECHNICAL FIELD

The present disclosure relates generally to wireless communicates and more particularly relates to connection re-establishment after loss of a Radio Resource Control connection.

BACKGROUND

The $3^{rd}$-Generation Partnership Project (3GPP) specifications refer to end-user wireless communication devices as "User Equipment" (UEs). UEs are also known as mobile terminals, wireless terminals and/or mobile stations, and are configured to communicate wirelessly in a cellular communications network or wireless communication system, sometimes also referred to as a cellular radio system or cellular network. The communication may be performed, e.g., between two UEs, between a user equipment and a regular telephone and/or between a UE and a server, via a Radio Access Network (RAN) and possibly one or more core networks that together make up the cellular communications network.

Various examples of and/or alternative names for UEs include mobile telephones, cellular telephones, laptops, or table computers with wireless capability, to name a few examples. UEs in the present context may be, for example, portable, pocket-storable, hand-held, computer-comprised, or vehicle-mounted mobile devices, enabled to communicate voice and/or data, via the RAN, with another entity, such as with another UE or with a server. The concept of "user equipment" also includes devices with communications capability of a machine-type character, such as wireless-enabled sensors, measurement devices, etc., where the device is not necessarily interacting with a human user at all.

A cellular communications network covers a geographical area that is divided into cell areas, where each cell area is served by a base station, e.g., a Radio Base Station (RBS). An RBS may sometimes be referred to as, e.g., "base station", "eNodeB", "NodeB", "B node", or "BTS" (Base Transceiver Station), depending on the technology and terminology used. The base stations may be of different classes, such as macro eNodeBs, home eNodeBs or pico base stations, where the classification is based on transmission power and thereby also cell size. A cell is the geographical area where radio coverage is provided by the base station at a base station site.

LTE Mobility

Mobility management is a challenging task in cellular communications systems, and well-functioning mobility management is crucial to the quality experienced by the end user of the wireless system. In LTE systems, the Radio Resource Control protocol (RRC) is the main signaling protocol for configuring connections, re-configuring connections, and other general connection handling in the LTE radio access network (E-UTRAN). (See 3GPP TS 36.331, available at www.3gpp.org.) RRC controls many functions such as connection setup, mobility, measurements, radio link failure and connection recovery.

A user equipment (UE) in LTE can be in one of two RRC states at any given time: RRC_CONNECTED state and RRC_IDLE state. In RRC_CONNECTED state, the UE's mobility is controlled by the network, based on, for example, measurements provided by the user equipment. That is, the network decides when and to which cell a UE should be handed over, based on, for example, measurement reports provided by the user equipment. The network, e.g., the LTE radio base station (called an eNodeB or eNB) in E-UTRAN, configures various measurement events, thresholds, etc. Based on this configuration, the user equipment then sends measurement reports to the network, so that the network can make a decision to hand over the user equipment to a stronger cell as the user equipment moves away from the present cell.

FIG. 1 illustrates a simplified signaling scheme for the LTE handover (HO) procedure. It should be noted that in LTE systems the HO command is in fact prepared in the Target eNB, i.e., the eNodeB that the user equipment will be handed over to, but the message is transmitted via the Source eNB. That is, the message comes from the Source eNB, from the user equipment's perspective.

In RRC_IDLE state, mobility is handled by UE-based cell-reselection, where a nomadic user equipment selects the "best" cell to camp on, based on, for example, various specified criteria and parameters that are broadcasted in the cells. For example, various cells or frequency layers can be prioritized over other, such that the user equipment tries to camp on a particular cell as long as the measured quality of a beacon or pilot in that cell is better than some other beacon or pilot received from other cells by at least a threshold quantity.

The present disclosure is primarily focusing on problems associated with network-controlled mobility as described above, e.g., for an LTE user equipment in RRC_CONNECTED state. The problems associated with losing RRC connection are therefore described in further detail below.

In a regular situation, and when a RRC_CONNECTED user equipment is moving out from the coverage of a first cell, also called a source cell, it should be handed over to a neighboring cell, also called a target cell or second cell, before the connection to the first cell is lost. That is, it is desirable that the connection is maintained with no or minimal disruption throughout the handover, such that the end-user is unaware of the ongoing handover. In order to succeed with this, it is necessary that:

a measurement report that indicates the need for mobility is transmitted by the user equipment and received by the Source eNB (see FIG. 1, item 110), and the Source eNB has sufficient time to prepare the handover to the target cell (by, among other things, requesting a handover from the Target eNB controlling the target cell; see FIG. 1, item 120), and the user equipment receives a handover command message from the network, as prepared by the Target eNB in control of the target cell and sent via the source cell to the user equipment (see FIG. 1, item 130).

In addition, and in order for the handover to be successful, the user equipment must finally succeed in establishing a connection to the target cell, which in LTE requires a successful random access request in the target cell (see FIG. 1, item 140) and a subsequent transmission of a HO complete message from the user equipment to the Target eNB (FIG. 1, item 150). It should be noted that specifications may differ somewhat in the naming of messages.

Thus, it is clear that in order for the handover to succeed, it is necessary that the sequence of events leading to a successful handover is started sufficiently early, so that the radio link to the first cell over which this signaling takes place does not deteriorate too much before completion of the signaling. If such deterioration happens before the handover signaling is completed in the source cell (i.e., the first cell), then the handover is likely to fail. Such handover failures are clearly not desirable. The current RRC specifications for LTE therefore provide various triggers, timers, and thresholds in order to adequately configure measurements, such that the need for handovers can be detected reliably, and sufficiently early.

In the process shown in FIG. 1, for example, the measurement report (item 110) is triggered by a measurement event called A3 event (item 105). This means that a measurement report is sent to the network when a criterion or criteria associated with the event is satisfied. As defined by the 3GPP specifications, an A3 event means, in short, that the signal from a neighbor cell is found to be better than the signal from the current serving cell, by at least a certain offset. There exist many different measurement event types, and there are multiple events that can be configured to trigger a report.

A network node in control of a cell, such as an eNodeB in LTE terminology, maintains a neighbor cell relation list. Whenever a reference is made to a neighbor cell in this disclosure, it should be understood as a reference to a cell that is typically included in the neighbor cell relation list of a network node. A neighbor cell is thus a cell that may be a candidate for a handover. In some cases, a network node maintains a separate neighbor cell list for each cell that it controls. From the perspective of the user equipment, a neighbor cell is a cell in the proximity of or overlapping with the cell to which the user equipment is currently connected.

Radio Link Failure and RRC Connection Re-Establishment

It may occur that a UE loses coverage from the cell that the user equipment is currently connected to. This could occur in a situation when the UE enters a fading dip, for example, or if a handover was needed as described above but the handover fails for one or another reason.

The quality of the radio link is typically monitored in the user equipment, e.g., on the physical layer, as described in the most recent versions of 3GPP TS 36.300, 3GPP TS 36.331, and 3GPP TS 36.133, and as summarized below. In this disclosure, "layer" refers to a protocol layer as implemented by a processing circuit executing appropriate firmware and/or software. Thus, a typical UE may comprise one or more processing circuits executing a protocol stack, such that the UE may be regarded as comprising several "layers," such as the physical layer, a data link layer, a network layer, etc.

Upon detecting that the physical layer is experiencing problems, e.g., according to criteria defined in 3GPP TS 36.133, the physical layer sends, to the RRC protocol, an indication of the detected problems. This indication is referred to as an out-of-sync indication. After a configurable number N310 of such consecutive indications, a timer T310 is started. If the link quality is not improved (recovered) while timer T310 is running, i.e., there are no N311 consecutive "in-sync" indications from the physical layer, a radio link failure (RLF) is declared in the user equipment. This sequence of events is shown in FIG. 2.

The functions of the currently relevant timers and counters described above are listed in Table 1, for reference. The UE may read the timer values and counter constants from system information broadcasted in the cell. Alternatively, it is possible to configure the UE with UE-specific values of the timers and counter constants using dedicated signaling, i.e., where specific values and constants are given to a particular UE or group of UEs with messages directed only to that UE or group of UEs.

TABLE 1

| Timer | Start | Stop | At expiry |
|---|---|---|---|
| T310 | Upon detecting physical layer problems i.e. upon receiving N310 consecutive out-of-sync indications from lower layers | Upon receiving N311 consecutive in-sync indications from lower layers, upon triggering the handover procedure and upon initiating the connection re-establishment procedure | If security is not activated: go to RRC_IDLE else: initiate the connection re-establishment procedure |
| T311 | Upon initiating the RRC connection re-establishment procedure | Selection of a suitable E-UTRA cell or a cell using another RAT. | Enter RRC_IDLE |

| Constant | Usage |
|---|---|
| N310 | Maximum number of consecutive "out-of-sync" indications received from lower layers |
| N311 | Maximum number of consecutive "in-sync" indications received from lower layers |

If timer T310 expires, indicating that a radio-link failure (RLF) has occurred, then the UE initiates a connection re-establishment to recover the ongoing RRC connection. This procedure includes cell selection by the user equipment. That is, the RRC_CONNECTED UE shall autonomously try to find a better cell to connect to, since the connection to the previous cell failed according to the described measurements. It could occur that the UE returns to the first cell anyway, but the same procedure is executed in any event. Once a suitable cell is selected as further described, e.g., in 3GPP TS 36.304, the UE requests a re-establishment of the connection in the selected cell. It is important to note the difference in mobility behavior when an RLF results in UE-based cell selection, in contrast to the normally applied network-controlled mobility.

If the re-establishment is successful, which depends on, among other things, whether the eNB controlling the selected cell is prepared to maintain the connection to the UE, which implies that it is prepared to accept the re-establishment request, then the connection between the UE and the network can resume, through the newly selected eNB (or the re-selected eNB, if the connection is re-established to the same eNB). In LTE, a re-establishment procedure includes a random-access request in the selected cell, followed by higher layer signaling where the user equipment sends a message with content that be used to identify and authenticate the UE. This is needed so that the network can trust that it knows exactly which UE is attempting to perform the re-establishment.

If the re-establishment attempt fails, the UE goes to RRC_IDLE state and the connection is released. To continue communication, a new RRC connection must then be requested and established. A re-establishment failure could occur, for example, if the eNB that receives the re-establishment request is unable to identify the UE that requests the re-establishment. Such a condition may occur if the receiving eNB has not been informed or otherwise prepared for a possible re-establishment from this UE.

The reason for introducing the timers T31x and counters N31x described above is to add some freedom and hysteresis for configuring the criteria for when a radio link should be considered as failed and needing to be re-established. This flexibility is desirable, since it would affect the end-user performance negatively if a connection is abandoned prematurely if it turned out that the loss of link quality was temporary and the UE succeeded in recovering the connection without any further actions or procedures, e.g., before T310 expires or before the counter reaches value N310.

The re-establishment procedure followed in an LTE network will be described in the following. It will be appreciated that other networks may have similar, but not necessarily identical, re-establishment procedures.

A network node, such as eNB, controlling a target cell receives a recovery request message from the UE, such as an RRC connection re-establishment request. In response to this message, the target eNB may respond with an RRC connection re-establishment message sent to the UE, by which the target eNB accepts the re-establishment request. The message may include various configuration parameters, so that the connection can be properly adapted and continued in the new cell. Other message names may of course apply, such as any reference to cell re-selection or handover.

Upon reception of the re-establishment message, the UE may now process the content of that message and resume the RRC connection according to the content and commands provided therein. Typically, the UE further sends a confirm message to the eNB of the target cell, where the confirm-message indicates that the communication between the UE and the target eNB can now resume. For example, the RRC connection re-establishment request, the re-establishment message, and subsequent confirm-message may typically include fields for supporting secure identification of the UE and fields for supporting contention resolution, i.e., such that the UE and its connection can be unambiguously and securely identified.

The recent and rapid uptake of mobile broadband data services has led to a need for increasing the capacity of cellular networks. One solution to achieve such a capacity increase is to use denser networks consisting of several layers of cells with different sizes: macro cells ensure large coverage with cells encompassing large areas, while micro-, pico- and even femto-cells are deployed in hot-spot areas where there is a large demand for capacity. Those cells typically provide connectivity in a much smaller area, but by adding additional cells and radio base-stations controlling those cells, capacity is increased as the new cells off-load the macros. Such networks are referred to as heterogeneous networks. FIG. 3 shows a UE 700 moving from the coverage of a pico-cell A into the coverage of macro cell B.

The different "layers" of cells can be deployed on the same carrier, i.e., in a reuse-1 fashion. Alternatively, small cells can be deployed on one or more different carriers, and the different cells on the various layers can even be deployed using different technologies, e.g., 3H/HSPA on the macro- and micro-layer, and LTE on the pico-layer as one non-exclusive example.

There is currently a large interest in investigating the potential of such heterogeneous networks. However, it has also been found that heterogeneous networks may result in an increased rate of handover failures and other radio-link failures. One reason is that the handover region in heterogeneous networks may be very small, meaning that the handover might fail since the user equipment loses coverage from the source cell before a handover to a target cell can be completed. For example, when a user equipment leaves a pico-cell, it may happen that the coverage border of the pico is so sharp, that the user equipment fails to receive any handover command towards a macro before losing coverage to the pico.

FIG. 4 illustrates handover regions for a macro-to-pico handover and a macro-to-macro handover respectively; it can be seen that the former is significantly smaller than the latter. As a result, it may not be "seen" at all by a mobile terminal that is moving quickly through the region.

Similar problems can occur when a UE connected to a macro cell suddenly enters a pico cell on the same carrier. It can happen that the control channels of the pico interfere with the signals that the UE needs to receive from the macro in order to complete the handover, for example, and the handover thus fails.

SUMMARY

The frequency and duration of cell searching during RRC connection re-establishment is likely to increase in environments where there is dense heterogeneous cell deployment. The increased time spent in re-establishment procedures and the consequently increased user-plane interruption causes a bad user experience.

According to several of the embodiments that are described in detail herein, this problem is addressed by the network providing assistance information for cell selection at re-establishment. This is done by indicating one or more of the following: a) a list of candidate carrier frequencies for the UE to use in performing cell search; b) a list of carrier frequencies the UE should avoid searching; and c) an indication of whether the UE should try directly searching for other RAT(s), and in some cases, which RAT(s)/frequencies should be used to begin the cell search.

Example embodiments include a method, in a mobile terminal, for controlling connection re-establishment between the mobile terminal and a wireless communication network, where the mobile terminal is being served in a first cell of the network. In some embodiments the wireless communication network is an LTE network, but the method may be implemented in other types of networks as well. The example method begins with receiving a configuration message from the network, the configuration message identifying at least one carrier frequency. Upon subsequently losing connection with the first cell without receiving a handover command, the mobile terminal initiates a cell search using the identified at least one carrier frequency, based on the configuration message.

In some embodiments, the configuration message indicates that one or more first carrier frequencies are to be searched, and initiating the cell search includes searching for the indicated one or more first carrier frequencies. In some of these and in some other embodiments, the configuration message indicates that one or more second carrier frequencies are not to be searched, and initiating the cell search comprises refraining from searching for the indicated one or more second carrier frequencies. In some embodiments, the configuration message further includes an indication that cell search should begin with an alternative radio access technology (RAT), and initiating the cell search includes beginning the cell search by searching for one or more carrier frequencies of an alternative RAT, based on the indication. In some embodiments, the configuration message further includes one or more third carrier frequencies corresponding to the alternative RAT, and initiating the cell search includes beginning the cell search by searching for one or more of the third carrier frequencies, based on the configuration message. In some embodiments, the configuration message further includes an identifier of the alternative RAT, where initiating the cell search comprises beginning the cell search by searching for a carrier frequency of the identified alternative RAT. The alternative RAT could be a High-Speed Packet Access (HSPA) network, for example, or a WiFi network, or any of a variety of other wireless networks.

Other example embodiments include a method, in a wireless network node, for controlling connection re-establishment between a mobile terminal and a wireless communication network. The example method begins with establishing a connection with the mobile terminal, and further includes sending a configuration message to the mobile terminal, prior to an initiation of a handover of the mobile terminal by the wireless network node, the configuration message identifying at least one carrier frequency for use by the mobile terminal in initiating a cell search upon losing connection with the wireless communication network.

In some embodiments, the configuration message indicates that one or more first carrier frequencies are to be searched in a cell search initiated upon losing connection with the wireless communication network. In some of these and in other embodiments, the configuration message indicates that one or more second carrier frequencies are not to be searched in a cell search initiated upon losing connection with the wireless communication network. In some embodiments, the configuration message further includes an indication that a cell search initiated upon losing connection with the wireless communication network should begin with an alternative radio access technology, RAT. The configuration message in these embodiments may further include one or more third carrier frequencies corresponding to the alternative RAT, and/or an identifier of the alternative RAT.

In some embodiments, the method further comprises first preparing at least one list of carrier frequencies for each of one or more cells, based on frequency relations for each cell obtained from statistical records or configuration information. In these embodiments, the configuration message is based on the at least one list corresponding to the cell serving the mobile terminal.

Other embodiments of the techniques and apparatus described herein include mobile terminal apparatus and wireless network node apparatus adapted to carry out one or more of the methods summarized above, or variants thereof. Other objects, advantages and novel features of the invention will become apparent from the following detailed description of the invention when considered in conjunction with the accompanying drawings and claims.

BRIEF DESCRIPTION OF THE DRAWINGS

The foregoing and other objects, features and advantages of the invention will be apparent from the following detailed description of several embodiments as illustrated in the drawings.

DETAILED DESCRIPTION

In the following description, for purposes of explanation and not limitation, specific details are set forth, such as particular architectures, interfaces, techniques, etc., in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout this document to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the document are not necessarily all referring to the same embodiment. Further, the particular features, structures or characteristics may be combined in any suitable manner in one or more embodiments.

Several aspects of the present invention are described within the context of E-UTRAN, also referred to as LTE. It should be understood that the problems and solutions described herein are equally applicable to wireless access networks and UEs implementing other access technologies and standards, such as technologies compliant to 3GPP specifications for Universal Mobile Telecommunications Systems (UMTS), other wide-area wireless network technologies such as WiMAX, or even networks based on wireless local-area network (WLAN) technology. The techniques are also applicable to mobile terminals and other equipment adapted to use two or more wireless network technologies. LTE is used as an example technology where the invention is suitable, and using LTE in the description therefore is particularly useful for understanding the problem and solutions solving the problem.

Various alternative embodiments for implementing the invention will be described in the following using non-exclusive examples.

Consider a UE in connected mode, implementing network controlled mobility and connected to a first cell, e.g., a pico-cell. The notation "connected to a cell" should be understood to imply that the user equipment is configured to send and/or receive data in at least this cell. Sometimes, this cell is also called the "serving cell", or "primary cell", PCell. The cell is typically controlled by one network node such as a radio base station, which means that "connected to a cell" is in this respect equivalent to the user equipment being "connected to a first radio base station," that is, to the radio base station that is in control of the aforementioned cell. Sometimes, this radio base station is called the "Serving eNB" or "serving radio base station."

Figure 1:
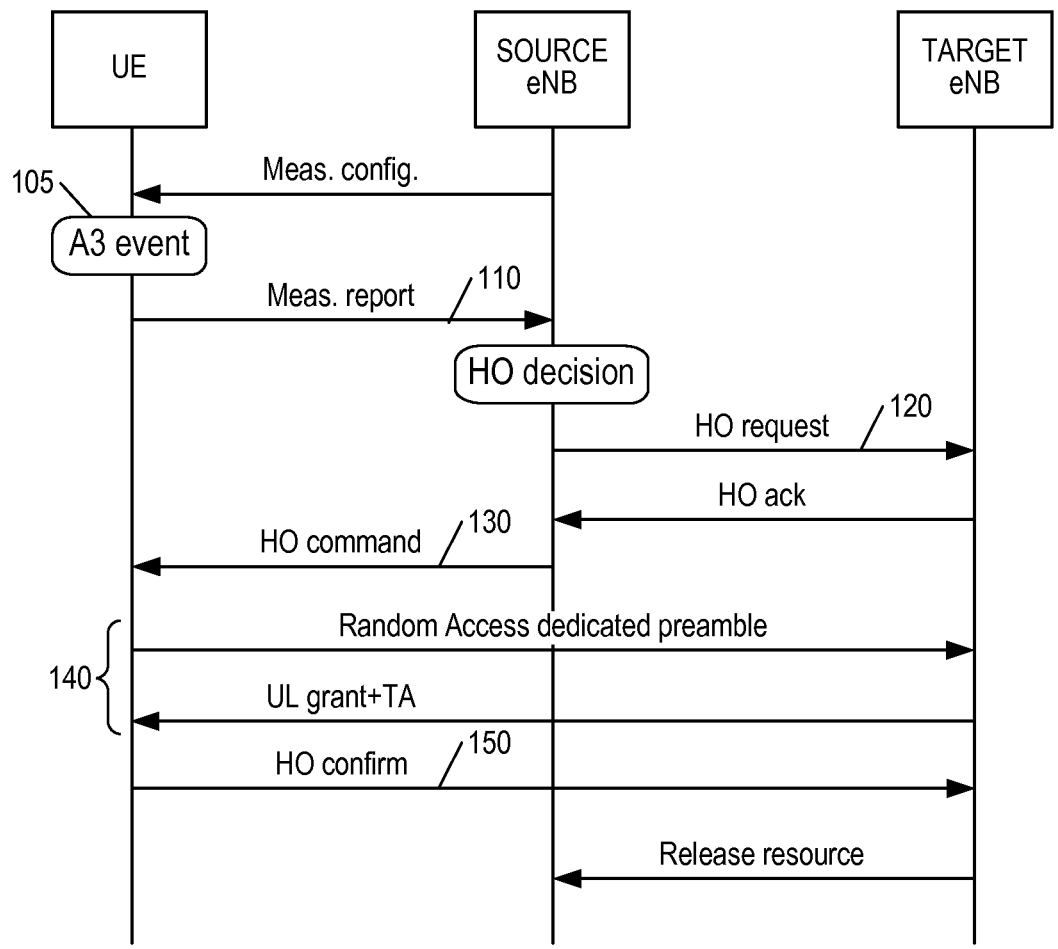
FIG. 1 shows a simplified signaling diagram illustrating the LTE handover procedure.
Figure 2:
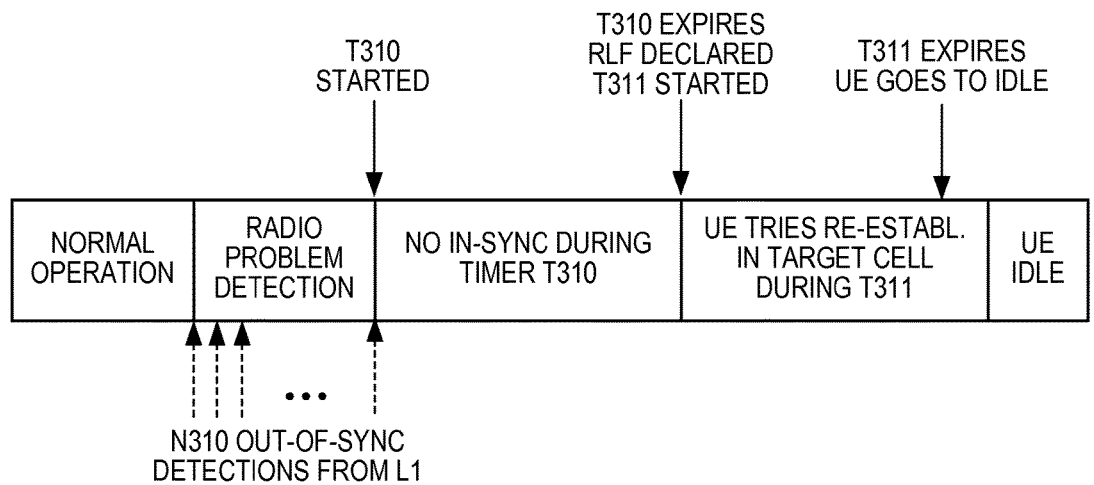
FIG. 2 shows how Radio Link Failure, RLF is declared in LTE.
Figure 3:
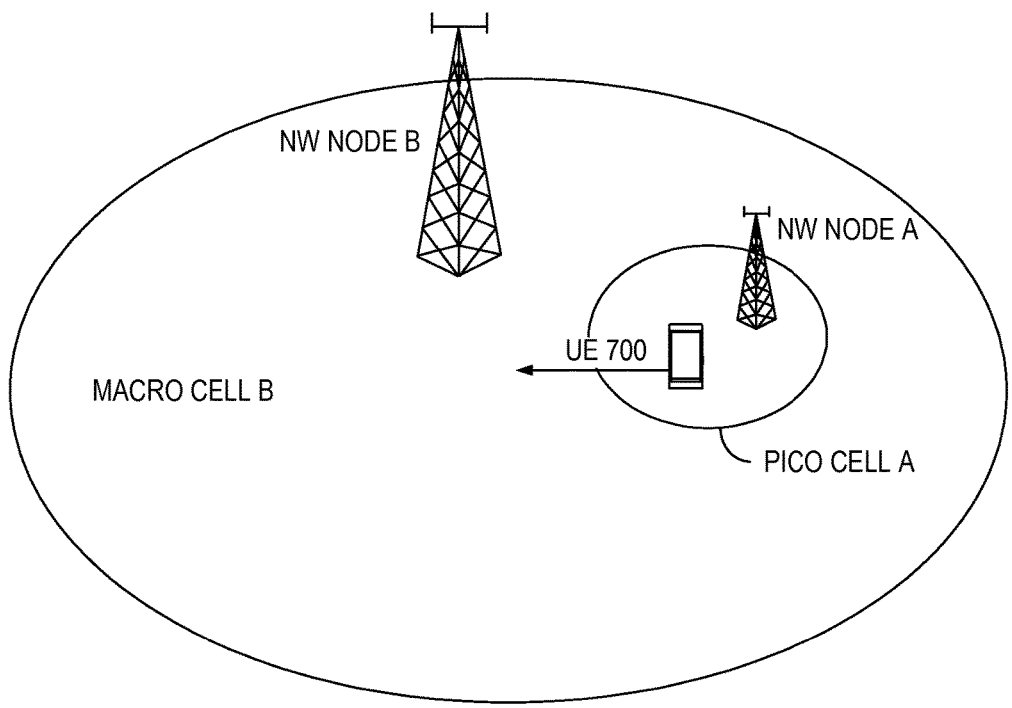
FIG. 3 illustrates the movement of a UE from an LPN coverage area to a macro-network coverage area.
Figure 4:
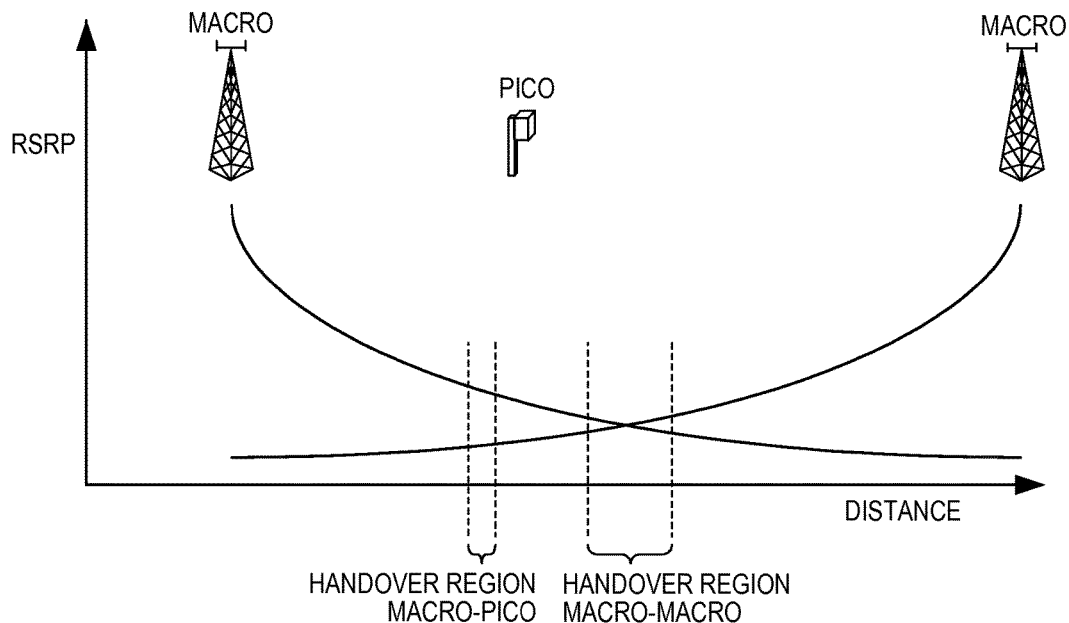
FIG. 4 illustrates the concept of handover regions for macro-to-pico and macro-to-macro cell changes.

In the example, the pico-cell is "surrounded" by a macro-cell that provides coverage in a much larger area, as shown in FIG. 3, for example. When the user equipment is moving out from the coverage of the small pico cell it quickly loses coverage of the pico cell to which it is currently connected. This can be seen in FIG. 4. In such a situation, there is a possibility that the UE will lose connectivity to the pico-cell before a handover is completed, or even before a handover procedure is initiated, which means that the UE will experience a radio-link failure that results in an undesired interruption in connectivity, as previously described.

The same problem could also occur if a UE moves from a macro cell to another cell, e.g., a pico-cell, where there is a very short handover region. The problem would be further exaggerated if the user equipment moves with a high speed.

In radio-link failures (RLFs) of the types described above, the UE will eventually try to re-establish the RRC connection. However, this may occur only after the procedures prior to the recovery procedure have been completed, as described in the background section above. Thus, the user equipment will observe "out-of-sync" on Layer 1 (L1) towards the source cell; those events will be counted on Layer 3 (L3) level, i.e, by the RRC protocol, as described above, until N310 such consecutive events have occurred; and then timer T310 will be started. Only when timer T310 has expired can the UE initiate re-establishment procedure by searching for a better cell to connect to, to recover the RRC connection. As detailed below, this searching for a better cell can add considerable time to the interruption in connectivity.

A RRC connection re-establishment procedure is thus initiated when a UE in RRC connected mode loses RRC connection due to any of several reasons discussed above, including a radio link failure, handover failure, or other radio link problem. Upon initiation of the procedure, the UE will perform cell selection in accordance with the cell selection process as specified in 3GPP TS 36.304 and as briefly described above.

The UE re-establishment delay is the time between the moment when any of the conditions requiring RRC re-establishment is detected by the UE and the time when the UE sends a Physical Random Access Channel (PRACH) transmission to the target cell.

At re-establishment, the UE will first start a cell selection procedure to find a suitable cell, and then will try to connect to a found cell. After a successful cell search and random access procedure, the UE sends a RRC re-establishment request to the network. However, the time required for the re-establishment delay can differ dramatically from one instance, scenario, or UE to another, as the time required depends on how many carrier frequencies and/or Radio Access Technologies (RATs) the UE searches for, which in turn depends on the number of frequencies/RATs supported by the UEs.

The cell selection process allows the UE to select a suitable cell, where it can "camp" to access available services. In the cell selection process, the UE can use stored information (Stored information cell selection) or not (Initial cell selection).

The UE may have some stored information identifying carrier frequencies and possibly other cell parameters, obtained from previously received measurement control information or from previously detected cells. The UE begins its search using this stored information, and selects a suitable cell as soon as it finds one. If no suitable cell is found using the stored information, then the UE starts the initial cell selection process.

During the initial cell selection process, an LTE UE scans all EUTRAN frequencies, according to its capabilities, to find a suitable cell. On each carrier frequency, the UE searches for the strongest cell. The UE selects a cell as soon as a suitable cell is found, where the suitability is assessed according to cell selection criteria provided to the UE. Thus, the UE first tries to find a suitable EUTRAN cell at re-establishment. If that fails, the UE searches for an inter-RAT cell. The UE will go to idle and try to set up a connection in the other RAT after an inter-RAT cell is selected. In short, when the UE initiates the RRC connection re-establishment procedure, the UE searches for a suitable EUTRAN cell or an inter-RAT cell. The UE may search all the EUTRAN frequencies and other RATs it supports and try to find a suitable cell on one frequency.

In a dense heterogeneous network environment, however, the number of handovers and radio link failures increase. This leads to more service interruptions for the UE. Often in such environments, the UE does not know the location of pico cells and/or the frequencies that pico cells are operating on in the neighborhood of macro cells or other pico cells. When a RRC re-establishment procedure is triggered for a reason other than handover failure, the UE usually does not have good knowledge of neighboring frequencies and possible candidate cells for starting the RRC re-establishment procedure. In particular, the UE is likely to be unaware that the RRC re-establishment will most likely fail on certain EUTRAN frequencies, or that the RRC re-establishment is very likely to not succeed on any EUTRAN frequency at all. Instead, the UE follows its usual cell selection procedure. The consequence is that the cell selection in dense heterogeneous scenarios may take a long time, in addition to occurring more frequently than in a conventional macro-cellular environment. This increases the total user plane interruption arising from the connection re-establishment procedure, thus worsening the user experience.

According to several of the embodiments that are described in detail herein, this problem is addressed by the network providing assistance information for cell selection at re-establishment. This is done by indicating one or more of the following: a) a list of candidate carrier frequencies for the UE to perform cell search; b) a list of carrier frequencies the UE should avoid searching; and c) an indication of whether the UE should try directly searching for other RAT(s), and in some cases, which RAT(s)/frequencies should be used to begin the cell search.

As an example, this approach can be introduced in the 3GPP RRC specifications, i.e., in the 3GPP specification document 3GPP TS 36.331, e.g., by including some or all of the above information in the RRC connection reconfiguration message.

According to several embodiments of this technique, the network collects information about frequency relations for each cell based on statistical records or configuration information. For each cell, one or two lists are prepared, for connection re-establishment purposes. A first list includes candidate frequency relations, i.e., carrier frequencies that should be searched by a UE in a cell searching process, i.e., upon losing a connection to the cell. These are in priority order, in some embodiments. The network may want to prevent the UE from re-establishing in certain frequencies, e.g., because of load balancing considerations, or because the network is aware that neighboring (Pico/macro) cells are only operating on certain frequencies. Thus, a second list (which may not exist in all embodiments) includes frequencies that should not be searched by a UE that loses a connection to the cell.

Furthermore, in consideration of load balancing and/or coverage problems in EUTRAN, the network may need to move some UEs to another RAT. Thus, in some embodiments, the network provides an indication of this to the UE, telling the UE to directly search for cells in the other RAT/frequency.

The above information, i.e., the first list and/or the second list and/or the indication that a UE should move to a different RAT, is provided to the UE by a serving cell, e.g., via an RRC connection reconfiguration message during either connection setup procedure, handover procedure, or connection re-establishment procedure when UE enters the cell. This information can be also updated in the UE by RRC connection reconfiguration, e.g., in the event that the content is changed. This may happen, for example, in the event of a network configuration change, or because of a change in the UE's position within the current cell.

A UE configured according to the present techniques receives the information from the network and applies the information during a subsequent cell selection procedure, when the re-establishment procedure is triggered.

The information described above can be signaled to the UE by the RRC Connection Reconfiguration message as specified in 3GPP TS 36.331. For example, the presence of a newly defined interRAT-CarrierInfo-r12 element may be used to indicate that the UE should search for a cell in the indicated RAT/frequency. Otherwise the interRAT-CarrierInfo-r12 element is not signaled.

Figure 5:
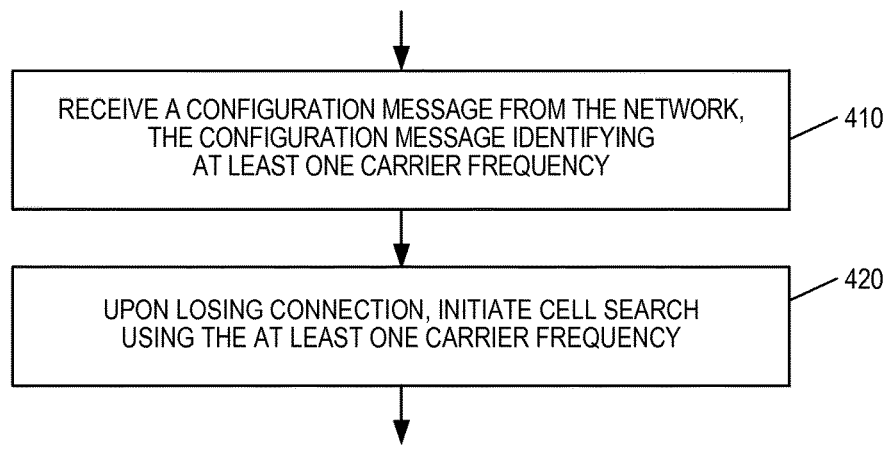
FIG. 5 shows a flowchart of a method according to embodiments performed in a mobile terminal.

With the above techniques in mind, it will be appreciated that the process flow diagram of FIG. 5 illustrates a generalized method, as implemented in a mobile terminal, for controlling connection re-establishment between the mobile terminal and a wireless communication network, where the mobile terminal is being served in a first cell of said network. As shown at block 510, the illustrated method begins with receiving a configuration message from the network, the configuration message identifying at least one carrier frequency. It should be appreciated that this configuration message is sent and received prior to the initiation of any handover procedure for the mobile terminal by the wireless network node controlling the first cell; it may be sent upon first connecting to the cell, for example, or upon a reconfiguration of the RRC connection. As shown at block 520, the method continues, upon subsequently losing connection with the first cell without receiving a handover command, with initiating a cell search using the at least one carrier frequency.

In some embodiments, the configuration message indicates that one or more first carrier frequencies are to be searched, and initiating the cell search includes searching for the one or more first carrier frequencies, based on the configuration message. In some of these and in some other embodiments, the configuration message indicates that one or more second carrier frequencies are not to be searched, and initiating the cell search comprises refraining from searching for the one or more second carrier frequencies, based on the configuration message.

In some embodiments, the configuration message further includes an indication that cell search should begin with an alternative radio access technology (RAT), and initiating the cell search includes beginning the cell search by searching for one or more carrier frequencies of an alternative RAT, based on the indication. In some embodiments, the configuration message further includes one or more third carrier frequencies corresponding to the alternative RAT, and initiating the cell search includes beginning the cell search by searching for one or more of the third carrier frequencies. In some embodiments, the configuration message further includes an identifier of the alternative RAT, where initiating the cell search comprises beginning the cell search by searching for a carrier frequency of the identified alternative RAT. The alternative RAT could be an High-Speed Packet Access (HSPA) network, for example, or a WiFi network, or any of a variety of other wireless networks.

Figure 6:
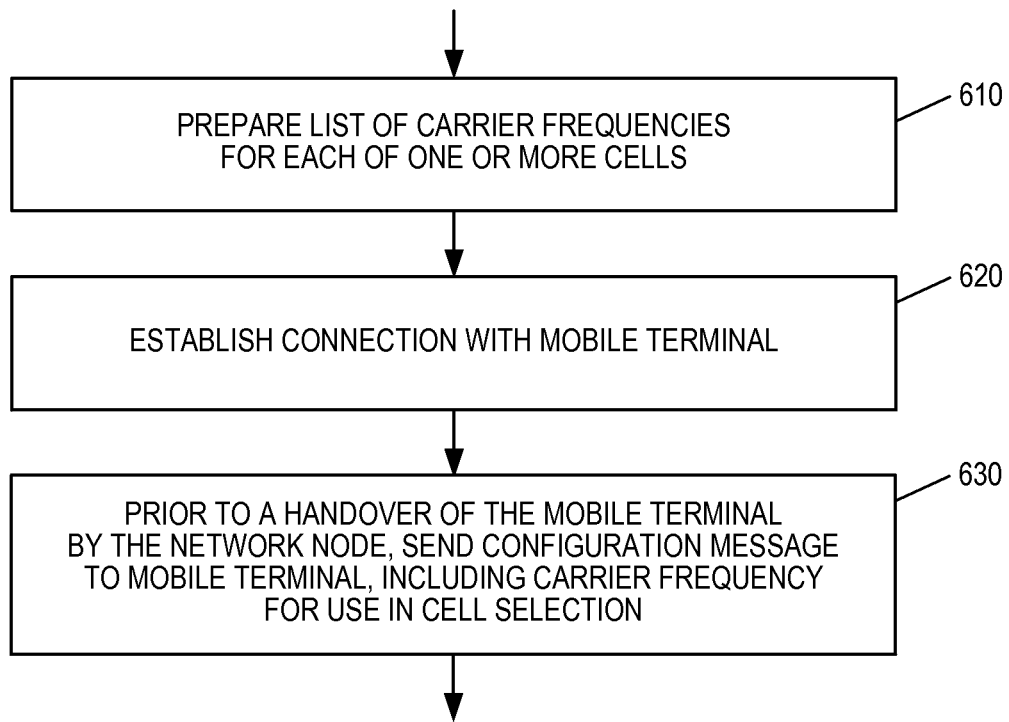
FIG. 6 shows a flowchart of a method according to embodiments performed in a network node.

FIG. 6 is a process flow diagram illustrating a corresponding method, as implemented in a wireless network node, such as a base station or a Radio Network Controller (RNC), or a combination of both.

As shown at block 610, the illustrated method begins with preparing at least one list of carrier frequencies for each of one or more cells, based on frequency relations for each cell obtained from statistical records or configuration information. This at least one list is subsequently used to provide assistance information to mobile terminals, for use in connection re-establishment. Note that in some embodiments the information used to provide the assistance information may be received from another node, or pre-configured in the network node of interest, rather than being prepared as shown in block 610. Accordingly, it will be understood that the operation shown in block 610 is "optional" in the sense that it need not be present in every embodiment of the illustrated method.

As shown at block 620, the method continues with the establishing of a connection with the mobile terminal. Prior to an initiation of a handover of the mobile terminal by the network node (if any), a configuration message is sent to the mobile terminal, as shown at block 630, the configuration message identifying at least one carrier frequency for use by the mobile terminal in initiating a cell search upon losing connection with the wireless communication network.

In some embodiments, the configuration message indicates that one or more first carrier frequencies are to be searched in a cell search initiated upon losing connection with the wireless communication network. In some of these and in some other embodiments, the configuration message indicates that one or more second carrier frequencies are not to be searched in a cell search initiated upon losing connection with the wireless communication network.

In some embodiments, the configuration message further includes an indication that a cell search initiated upon losing connection with the wireless communication network should begin with an alternative radio access technology (RAT). In some of these embodiments, the configuration message further includes one or more third carrier frequencies corresponding to the alternative RAT, while in others the configuration message may further include an identifier of the alternative RAT.

Figure 7:
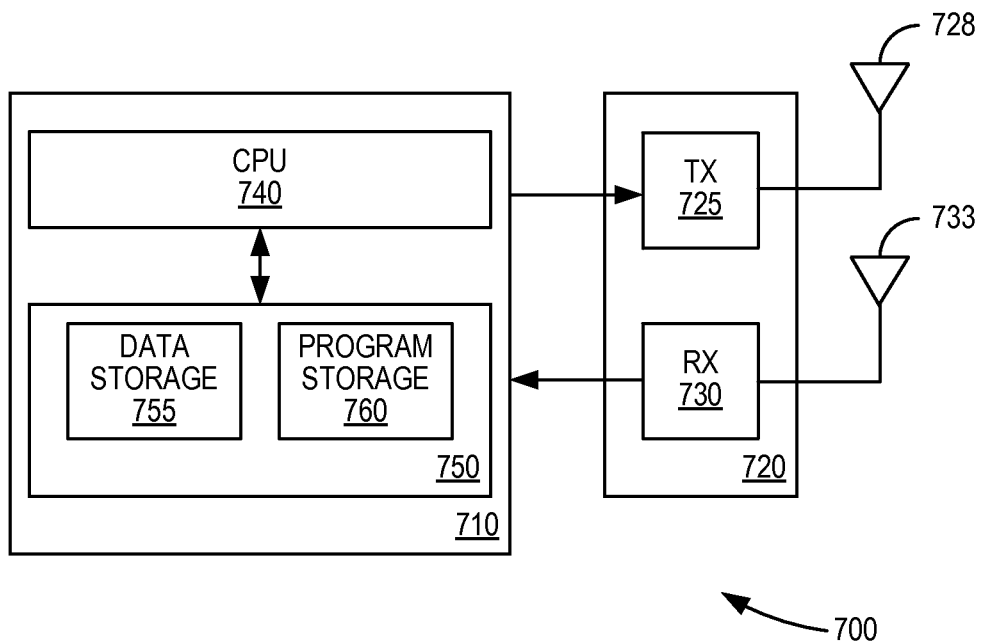
FIG. 7 shows schematically a user equipment according to embodiments.

Several of the techniques and methods described above may be implemented using radio circuitry and electronic data processing circuitry provided in a mobile terminal. FIG. 7 illustrates features of an example mobile terminal 700 according to several embodiments of the present invention. Mobile terminal 700, which may be a UE configured for dual-connectivity operation with an LTE network (E-UTRAN), for example, comprises a transceiver unit 720 for communicating with one or more base stations as well as a processing circuit 710 for processing the signals transmitted and received by the transceiver unit 720. Transceiver unit 720 includes a transmitter 725 coupled to one or more transmit antennas 728 and receiver 730 coupled to one or more receiver antennas 733. The same antenna(s) 728 and 733 may be used for both transmission and reception. Receiver 730 and transmitter 725 use known radio processing and signal processing components and techniques, typically according to a particular telecommunications standard such as the 3GPP standards for LTE.

Note also that transmitter unit 720 may comprise separate radio and/or baseband circuitry for each of two or more different types of radio access network, such as radio/baseband circuitry adapted for E-UTRAN access and separate radio/baseband circuitry adapted for Wi-Fi access. The same applies to the antennas—while in some cases one or more antennas may be used for accessing multiple types of networks, in other cases one or more antennas may be specifically adapted to a particular radio access network or networks. Because the various details and engineering tradeoffs associated with the design and implementation of such circuitry are well known and are unnecessary to a full understanding of the invention, additional details are not shown here.

Processing circuit 710 comprises one or more processors 740 coupled to one or more memory devices 750 that make up a data storage memory 755 and a program storage memory 760. Processor 740, identified as CPU 740 in FIG. 7, may be a microprocessor, microcontroller, or digital signal processor, in some embodiments. More generally, processing circuit 710 may comprise a processor/firmware combination, or specialized digital hardware, or a combination thereof. Memory 750 may comprise one or several types of memory such as read-only memory (ROM), random-access memory, cache memory, flash memory devices, optical storage devices, etc. Because terminal 700 supports multiple radio access networks, processing circuit 710 may include separate processing resources dedicated to one or several radio access technologies, in some embodiments. Again, because the various details and engineering tradeoffs associated with the design of baseband processing circuitry for mobile devices are well known and are unnecessary to a full understanding of the invention, additional details are not shown here.

Typical functions of the processing circuit 710 include modulation and coding of transmitted signals and the demodulation and decoding of received signals. In several embodiments of the present invention, processing circuit 710 is adapted, using suitable program code stored in program storage memory 760, for example, to carry out one of the techniques described above for controlling connection re-establishment. Of course, it will be appreciated that not all of the steps of these techniques are necessarily performed in a single microprocessor or even in a single module.

Figure 8:
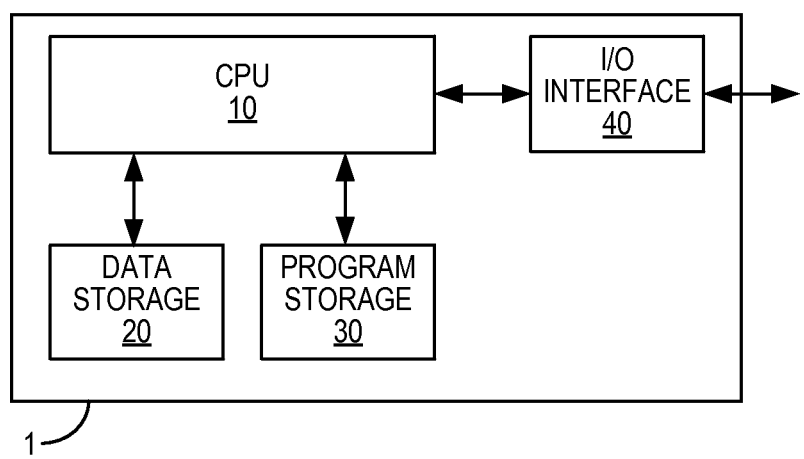
FIG. 8 shows schematically an example network node.

Similarly, several of the techniques and processes described above can be implemented in a network node, such as an eNodeB or other node in a 3GPP network. FIG. 8 is a schematic illustration of a node 1 in which a method embodying any of the presently described network-based techniques can be implemented. A computer program for controlling the node 1 to carry out a method embodying the present invention is stored in a program storage 30, which comprises one or several memory devices. Data used during the performance of a method embodying the present invention is stored in a data storage 20, which also comprises one or more memory devices. During performance of a method embodying the present invention, program steps are fetched from the program storage 30 and executed by a Central Processing Unit (CPU) 10, retrieving data as required from the data storage 20. Output information resulting from performance of a method embodying the present invention can be stored back in the data storage 20, or sent to an Input/Output (I/O) interface 40, which includes a network communications interface circuit for sending and receiving data to and from other network nodes and which may also include a radio transceiver for communicating with one or more terminals.

Accordingly, in various embodiments, processing circuits, such as the CPU 10 and memory circuits 20 and 30 in FIG. 8 or the CPU 840 and memory 1550 in FIG. 7, are configured to carry out one or more of the techniques described in detail above. Likewise, other embodiments may include mobile terminal apparatus or wireless network node apparatus including one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

It should also be appreciated that a processing circuit, as adapted with program code stored in memory, can implement the process flow of FIG. 5 or FIG. 6, or variants thereof, using an arrangement of functional "modules" or "units," where the modules or units are computer programs or portions of computer programs executing on the processor circuit. Accordingly, any of the apparatus described above, whether forming all or part of a mobile terminal apparatus or network node apparatus, can be understood as comprising one or more functional modules or units implemented with processing circuitry.

Thus, for example, a mobile terminal apparatus according to some embodiments may comprise a radio transceiver circuit configured to communicate with a wireless communication network, a receiver unit for receiving a configuration message from the network, via the radio transceiver circuit, the configuration message identifying at least one carrier frequency, and a cell search unit for initiating a cell search using the at least one carrier frequency, upon losing connection with the first cell without receiving a handover command. Likewise, a network node apparatus may comprise a an interface circuit configured to communicate with a mobile terminal and with one or more other wireless network nodes, a connection establishment unit for establishing a connection with the mobile terminal, using the radio transceiver, and a sending unit for sending a configuration message to the mobile terminal via the radio transceiver, prior to an initiation of a handover of the mobile terminal by the wireless network node (if any), the configuration message identifying at least one carrier frequency for use by the mobile terminal in initiating a cell search upon losing connection with the wireless communication network.

It will be recognized by the person of skill in the art that various modifications may be made to the above described embodiments without departing from the scope of the present invention. For example, although embodiments of the present invention have been described with examples that include a communication system compliant to the 3GPP-specified LTE standards, it should be noted that the solutions presented may be equally well applicable to other networks. The specific embodiments described above should therefore be considered exemplary rather than limiting the scope of the invention. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

In the present description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) running on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure, and shall not be restricted or limited by the foregoing detailed description.

What is claimed is:

1. A method in a mobile terminal for controlling connection re-establishment between said mobile terminal and a wireless communication network, said mobile terminal being served in a first cell of said network, the method comprising:
   receiving a configuration message from the network, the configuration message comprising assistance information for radio resource control (RRC) connection re-establishment including at least one carrier frequency; and,
   responsive to subsequently losing connection with the first cell due to radio link failure, initiating a cell search using the assistance information including the at least one carrier frequency.

2. The method of claim 1, wherein the configuration message indicates one or more first carrier frequencies that are to be searched, and wherein initiating the cell search comprises searching for the indicated one or more first carrier frequencies, based upon the configuration message.

3. The method of claim 1, wherein the configuration message indicates one or more second carrier frequencies that are not to be searched, and wherein initiating the cell search comprises searching only for carrier frequencies other than the indicated one or more second carrier frequencies, based on the configuration message.

4. The method of claim 1, wherein the configuration message is received via a first radio access technology (RAT) and further includes an indication that the cell search should begin with an alternative RAT, and wherein initiating the cell search comprises beginning the cell search by searching for one or more carrier frequencies of the alternative RAT, based upon the indication.

5. The method of claim 4, wherein the configuration message further includes one or more third carrier frequencies corresponding to the alternative RAT, and wherein initiating the cell search comprises beginning the cell search by searching for one or more of the third carrier frequencies, based on the configuration message.

6. The method of claim 4, wherein the configuration message further includes an identifier of the alternative RAT, and wherein initiating the cell search comprises beginning the cell search by searching for a carrier frequency of the identified alternative RAT.

7. A method, in a wireless network node, for controlling radio resource control (RRC) connection re-establishment between a mobile terminal and a wireless communication network, the method comprising:
    establishing a connection with the mobile terminal; and
    sending a configuration message to the mobile terminal, the configuration message comprising assistance information for RRC connection re-establishment including at least one carrier frequency for use by the mobile terminal in initiating a cell search responsive to losing connection with the wireless communication network due to radio link failure.

8. The method of claim 7, wherein the configuration message indicates one or more first carrier frequencies that are to be searched in the cell search initiated upon losing connection with the wireless communication network.

9. The method of claim 7, wherein the configuration message indicates one or more second carrier frequencies that are not to be searched in the cell search initiated upon losing connection with the wireless communication network.

10. The method of claim 7, wherein the configuration message is received via a first radio access technology (RAT) and further includes an indication that the cell search initiated upon losing connection with the wireless communication network should begin with an alternative RAT.

11. The method of claim 10, wherein the configuration message further includes one or more third carrier frequencies corresponding to the alternative RAT.

12. The method of claim 10, wherein the configuration message further includes an identifier of the alternative RAT.

13. The method of claim 7, wherein the method further comprises first preparing at least one list of carrier frequencies for each of one or more cells, based on frequency relations for each cell obtained from statistical records or configuration information, wherein the configuration message is based on the at least one list corresponding to the cell serving the mobile terminal.

14. A mobile terminal comprising a radio transceiver circuit configured to communicate with a wireless communication network and a processing circuit configured to control the radio transceiver circuit, wherein the processing circuit is further configured to:
    receive a configuration message from the network, via the radio transceiver circuit, the configuration message comprising assistance information for radio resource control (RRC) connection re-establishment including at least one carrier frequency; and,
    responsive to subsequently losing connection with the first cell due to radio link failure, initiate a cell search using the assistance information including the at least one carrier frequency.

15. The mobile terminal of claim 14, wherein the configuration message indicates one or more first carrier frequencies that are to be searched, and wherein the processing circuit is configured to initiate the cell search by searching for the indicated one or more first carrier frequencies, based on the configuration message.

16. The mobile terminal of claim 14, wherein the configuration message indicates one or more second carrier frequencies that are not to be searched, and wherein the processing circuit is configured to search only for carrier frequencies other than the indicated one or more second carrier frequencies, based on the configuration message.

17. The mobile terminal of claim 14, wherein the processing circuit is configured to receive the configuration message via a first radio access technology (RAT) wherein the configuration message further includes an indication that the cell search should begin with an alternative RAT, and wherein the processing circuit is configured to begin the cell search by searching for one or more carrier frequencies of the alternative RAT, based on the indication.

18. The mobile terminal of claim 17, wherein the configuration message further includes one or more third carrier frequencies corresponding to the alternative RAT, and wherein the processing circuit is configured to begin the cell search by searching for one or more of the third carrier frequencies, based on the configuration message.

19. The mobile terminal of claim 18, wherein the configuration message further includes an identifier of the alternative RAT, and wherein the processing circuit is configured to begin the cell search by searching for a carrier frequency of the identified alternative RAT, based on the configuration message.

20. A wireless network node, comprising a radio transceiver circuit configured to communicate with a mobile terminal, a communications interface circuit configured for communication with one or more other wireless network nodes, and a processing circuit configured to control the radio transceiver circuit and the communications interface circuit, wherein the processing circuit is further configured to:
    establish a connection with the mobile terminal, using the radio transceiver circuit; and
    send a configuration message to the mobile terminal via the radio transceiver circuit, the configuration message comprising assistance information for radio resource control (RRC) connection re-establishment including at least one carrier frequency for use by the mobile terminal in initiating a cell search responsive to losing connection with the wireless communication network due to radio link failure.

21. The wireless network node of claim 20, wherein the configuration message indicates one or more first carrier frequencies that are to be searched in the cell search initiated upon losing connection with the wireless communication network.

22. The wireless network node of claim 20, wherein the configuration message indicates one or more second carrier frequencies that are not to be searched in the cell search initiated upon losing connection with the wireless communication network.

23. The wireless network node of claim 20, wherein the processing circuit is configured to send the configuration message via a first radio access technology (RAT) and wherein the configuration message further includes an indication that the cell search initiated upon losing connection with the wireless communication network should begin with the alternative RAT.

24. The wireless network node of claim 23, wherein the configuration message further includes one or more third carrier frequencies corresponding to the alternative RAT.

25. The wireless network node of claim 23, wherein the configuration message further includes an identifier of the alternative RAT.

26. The wireless network node of claim 20, wherein the processing circuit is further configured to first prepare at least one list of carrier frequencies for each of one or more cells, based on frequency relations for each cell obtained from statistical records or configuration information, and to form the configuration message based on the at least one list corresponding to the cell serving the mobile terminal.

* * * * *